United States Patent
Xu

(10) Patent No.: US 12,147,047 B1
(45) Date of Patent: Nov. 19, 2024

(54) METHODS, APPARATUSES AND COMPUTER PROGRAM PRODUCTS FOR PROVIDING TRANSMISSION CHIRPED VOLUME BRAGG GRATING BASED COMPACT WAVEGUIDE IN-COUPLERS FOR LIGHT SOURCES

(71) Applicant: META PLATFORMS, INC., Menlo Park, CA (US)

(72) Inventor: Jian Xu, Redmond, WA (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

(21) Appl. No.: 17/931,827

(22) Filed: Sep. 13, 2022

Related U.S. Application Data

(60) Provisional application No. 63/390,194, filed on Jul. 18, 2022.

(51) Int. Cl.
| | |
|---|---|
| *G09G 5/00* | (2006.01) |
| *G02B 5/18* | (2006.01) |
| *G02B 6/34* | (2006.01) |
| *G02B 27/01* | (2006.01) |
| *G03H 1/02* | (2006.01) |

(52) U.S. Cl.
CPC ....... *G02B 27/0172* (2013.01); *G02B 5/1842* (2013.01); *G02B 6/34* (2013.01); *G03H 1/0248* (2013.01); *G02B 2027/0125* (2013.01); *G02B 2027/0178* (2013.01); *G03H 2001/0264* (2013.01); *G03H 2260/12* (2013.01)

(58) Field of Classification Search
CPC ..... G02B 27/0172; G02B 6/34; G03H 1/0248

USPC .......................................................... 345/8
See application file for complete search history.

(56) References Cited

U.S. PATENT DOCUMENTS

| | | | |
|---|---|---|---|
| 8,306,088 B2 | 11/2012 | Volodin et al. | |
| 9,793,674 B2 | 10/2017 | Volodin et al. | |
| 11,025,897 B2 | 6/2021 | Schowengerdt et al. | |
| 2001/0033400 A1* | 10/2001 | Sutherland | G02F 1/1326 430/1 |
| 2003/0039001 A1* | 2/2003 | King | G11B 7/0065 |
| 2005/0259216 A1* | 11/2005 | Lin | G02F 1/31 349/196 |
| 2017/0219841 A1* | 8/2017 | Popovich | G02B 6/0016 |
| 2019/0285893 A1 | 9/2019 | Wang et al. | |
| 2021/0033857 A1* | 2/2021 | Waldern | G02B 5/1819 |
| 2022/0283378 A1* | 9/2022 | Waldern | G02B 5/1857 |
| 2022/0390744 A1* | 12/2022 | Alasaarela | G02B 27/0081 |

* cited by examiner

*Primary Examiner* — Jonathan M Blancha
(74) *Attorney, Agent, or Firm* — BakerHostetler

(57) ABSTRACT

Methods and systems for propagating light into a waveguide are provided. The system may include a light source configured to generate light. The system may include at least one mirror configured to direct the light into one or more rays of light. The system may include a Surface Relief Grating disposed on a Volume Bragg Grating. The Surface Relief Grating may receive the one or more rays of light and may diffract the one or more rays of light. The Volume Bragg Grating may be disposed on the waveguide in which the waveguide may be configured to receive the one or more rays of light from the Volume Bragg Grating and propagate the one or more rays of light throughout the waveguide such that an off-Bragg condition is exhibited by the one or more rays of light propagating through the waveguide.

20 Claims, 12 Drawing Sheets

METHODS, APPARATUSES AND COMPUTER PROGRAM PRODUCTS FOR PROVIDING TRANSMISSION CHIRPED VOLUME BRAGG GRATING BASED COMPACT WAVEGUIDE IN-COUPLERS FOR LIGHT SOURCES

CROSS-REFERENCE TO RELATED APPLICATIONS

This application claims the benefit of U.S. Provisional Application No. 63/390,194, filed Jul. 18, 2022, the entire content of which is incorporated herein by reference.

TECHNOLOGICAL FIELD

Exemplary embodiments of this disclosure relate generally to methods and apparatuses for efficient light propagation within waveguides for artificial reality displays and head-mounted display devices and the like such that the waveguide structures in-couple light from light sources to enable the light to achieve total internal reflection within the waveguide as the light propagates within the waveguide.

BACKGROUND

Artificial reality (AR) is a form of reality that has been adjusted in some manner before presentation to a user, which may include, for example, a virtual reality, an augmented reality, a mixed reality, a hybrid reality, or some combination or derivative thereof. Artificial reality content may include completely computer-generated content or computer-generated content combined with captured (e.g., real-world) content. The artificial reality content may include video, audio, haptic feedback, or some combination thereof, any of which may be presented in a single channel or in multiple channels (such as stereo video that produces a three-dimensional (3D) effect to the viewer).

Some standard artificial reality systems may have a waveguide display, and these waveguide displays may typically need an in-coupler to couple the light from a projector to a waveguide. Laser scanning projectors may have very high brightness; however, its optical pupil (e.g., a virtual image of an aperture of a mirror, lens, etc.) may be on a scanning mirror. The positioning of the optical pupil in laser scanning projectors may eventually cause a beam walk-off on the waveguide, thus reducing in-coupling efficiency and reducing the contrast ratio of an eye image.

In view of the foregoing drawbacks, it may be beneficial to provide an efficient and reliable mechanism for improving waveguide structures to in-couple light from light sources such that the light i-achieves total internal reflection within the waveguide as the light propagates within the waveguide.

BRIEF SUMMARY

Exemplary embodiments are described for an input grating assembly which may be associated with artificial reality applications. The input grating assembly system may include a Volume Bragg Grating (VBG) and/or a Surface Relief Grating (SRG).

In an example embodiment, a system may include a waveguide having a front and rear surface. The waveguide may be associated with a display and may be arranged to guide light into an eye of a user to make an image visible to the user. The light may be guided through a SRG, and/or a VBG, and may be propagated through a waveguide that causes light in-coupling.

In one example embodiment, a device for propagating light into a waveguide is provided. The device may include at least one light source configured to generate light. The device may further include at least one mirror configured to direct the light into one or more rays of light. The device may further include a Surface Relief Grating disposed on a Volume Bragg Grating. The Surface Relief Grating may be configured to receive the one or more rays of light and diffract the one or more rays of light onto one or more gratings of the Volume Bragg Grating. The device may further include at least one waveguide disposed beneath the Volume Bragg Grating. The at least one waveguide may be configured to receive the one or more rays of light from the Volume Bragg Grating and propagate the one or more rays of light throughout the at least one waveguide such that an off-Bragg condition is exhibited by the one or more rays of light propagating through the at least one waveguide.

In another example embodiment, a method for propagating light into a waveguide is provided. The method may include directing light from a light source to at least one mirror. The method may further include receiving, via the at least one mirror, the light and emitting one or more rays of light based on the light. The method may further include receiving, at a Surface Relief Grating disposed on a Volume Bragg Grating, the one or more rays of light and diffracting, by the Surface Relief Grating, the one or more rays of light. The method may further include reflecting, by the Volume Bragg Grating, the one or more rays of light causing the one or more rays of light to propagate throughout at least one waveguide of a device such that an off-Bragg condition is exhibited by the one or more rays of light propagating through the at least one waveguide.

In yet another example embodiment, a computer program product for propagating light into a waveguide is provided. The computer program product includes at least one computer-readable storage medium having computer-executable program code instructions stored therein. The computer-executable program code instructions may include program code instructions configured to direct light from a light source to at least one mirror. The computer program product may further include program code instructions configured to facilitate receipt, via the at least one mirror, of the light and emitting one or more rays of light based on the light. The computer program product may further include program code instructions configured to facilitate receipt, at a Surface Relief Grating disposed on a Volume Bragg Grating, of the one or more rays of light and diffracting, by the Surface Relief Grating, the one or more rays of light. The computer program product may further include program code instructions configured to facilitate reflection, by the Volume Bragg Grating, of the one or more rays of light causing the one or more rays of light to propagate throughout at least one waveguide of a device such that an off-Bragg condition is exhibited by the one or more rays of light propagating through the at least one waveguide.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

Figure 1:
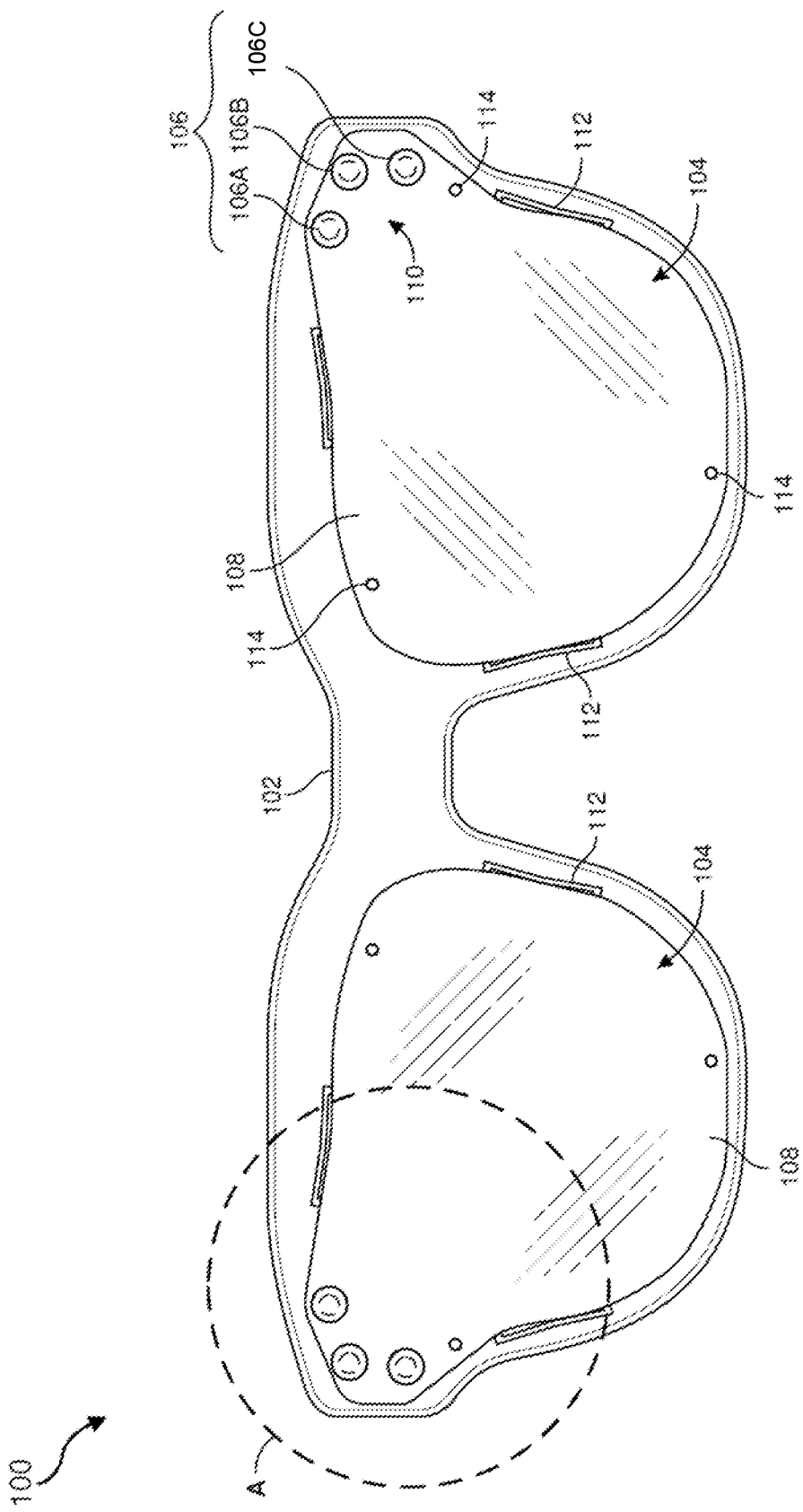
FIG. 1 is a plan view of a head-mounted display (HMD) associated with artificial reality content in accordance with an exemplary embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Some embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the disclosure. Moreover, the term "exemplary", as used herein, is not provided to convey any qualitative assessment, but instead merely to convey an illustration of an example. Thus, use of any such terms should not be taken to limit the spirit and scope of embodiments of the disclosure.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a light projector may be any light source used in artificial reality systems including, but not limited to, a light point source and/or a laser scanning projector.

As referred to herein, a Bragg condition may indicate a relationship between an angle of a light ray(s)/light beam(s) having a reflection within a waveguide that causes the light ray(s)/light beam(s) to exit from the waveguide and does not result in a total internal reflection of the light ray(s)/light beam(s) within the waveguide.

As referred to herein, an off-Bragg condition may refer to an instance in which a Bragg condition is not met. In some example embodiments, an off-Bragg condition may denote that a light ray(s)/light beam(s) emitted from a light source to a waveguide is not outcoupled from the waveguide.

As referred to herein, a beam walk-off may refer to an instance in which a light ray(s)/light beam(s) exits or is outcoupled from a waveguide and is not propagated throughout the waveguide.

It is to be understood that the methods and systems described herein are not limited to specific methods, specific components, or to particular implementations. It is also to be understood that the terminology used herein is for the purpose of describing particular embodiments only and is not intended to be limiting.

HMD's including one or more near-eye displays may often be used to present visual content to a user for use in artificial reality applications. One type of near-eye display may include an enclosure that houses components of the display and/or is configured to rest on the face of a user, such as for example a frame. The near-eye display may include a waveguide that directs light from a projector to a location in front of the user's eyes. Because of human visual sensitivity, slight deviations in optical quality may be apparent to the user of a near-eye display. Proper alignment and propagation of light projections causing in-coupling within a waveguide may allow for improved optical quality and/or image quality within an HMD system.

The present disclosure is generally directed to systems and methods for improved optical quality within artificial reality systems. Examples in the present disclosure may include head-mounted displays that may include a waveguide accompanied with Volume Bragg Gratings and Surface Relief Gratings attached to the surface of the waveguide. A waveguide may be configured to direct images from a light projector to a user's eye(s).

Exemplary System Architecture

FIG. 1 illustrates an example head-mounted display 100 associated with artificial reality content. The head mounted display 100 may include 102 and a display assembly 104 coupled to the enclosure 102. The display assembly 104 for side of the head mounted display 100 may include a light projector 106 (shown in dashed lines in FIG. 1) and a waveguide 108 configured to direct images from the light projector 106 to a user's eye. In some examples, the light projector may include three sub-projectors 106A, 106B, and 106C that are configured to project light of different wavelengths (e.g., colors such as red, green, and/or blue). The waveguide 108 may input grating assembly 110 positioned adjacent to the light projector 106. The input grating assembly 110 may comprise at least two input gratings. In an exemplary embodiment, these input gratings may be a Volume Bragg Grating and a Surface Relief Grating. The input grating assembly 110 may be configured to enable light from the light projector 106 to enter into the waveguide 108, to be directed to the center of the waveguide 108 for presentation to the user's eye. For example, as shown in FIG. 1, the at least two input gratings may include optical apertures respectively aligned with the three sub-projectors 106A, 106B, 106C of the light projector 106.

In some examples, head-mounted display 100 may be implemented in the form of augmented-reality glasses. Accordingly, the waveguide 108 may be at least partially transparent to visible light to allow the user to view a real-world environment through the waveguide 108.

Figure 2:
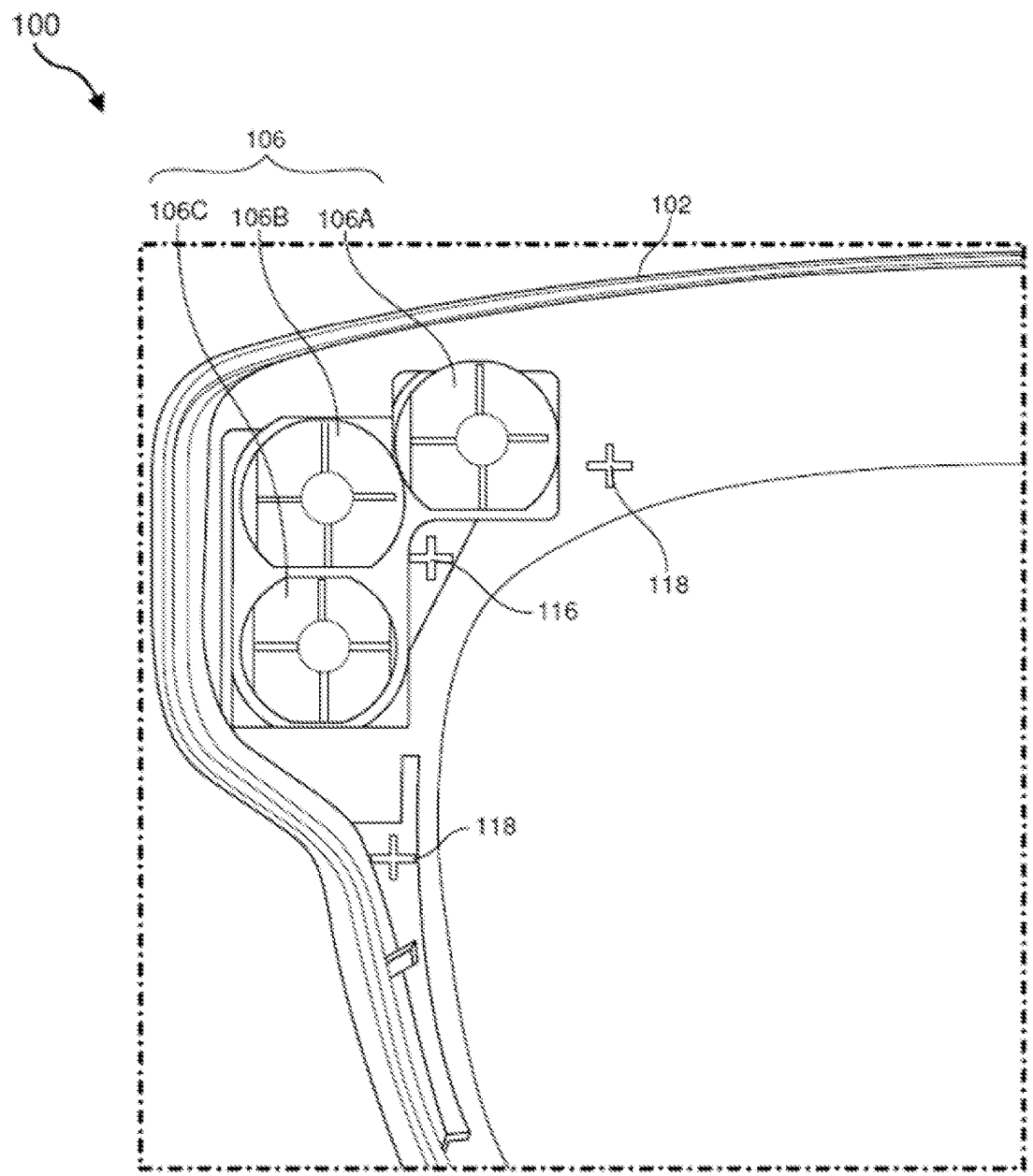
FIG. 2 is a detailed view of a light projector mounted to a frame of the head-mounted display, taken at dashed circle A of FIG. 1 in accordance with an exemplary embodiment.

FIG. 2 illustrates the light projector 106 of the head-mounted display 100 shown in the dashed circle A of FIG. 1. The waveguide 108 is not shown in FIG. 2, to more clearly show underlying features of the head-mounted display 100. As shown in FIG. 2, the light projector 106 may be mounted on the enclosure 102 of the head-mounted display 100, such as in an upper corner of the enclosure 102. The first sub-projector 106A may include a blue light source, the second sub-projector 106B may include a red light source, and the third sub-projector 106C may include a green light source. Other colors and arrangements of the sub-projectors 106A, 106B, and 106C may also be possible.

To assemble the head-mounted display 100, the three sub-projectors 106A, 106B, and 106C may be initially assembled with each other (e.g., three light sources mounted to a common substrate, three collimating lenses aligned on the three light sources) to form the light projector 106 as a unit. The light projector 106 may include one or more projector fiducial marks 116, which may be used in optically aligning (e.g., positioning, orienting, securing) the light projector 106 with the enclosure 102. In some examples, the enclosure 102 may likewise include one or more frame fiducial marks 118 to assist in the optical alignment of the light projector 106 with the enclosure 102.

Optical alignment of the light projector 106 relative to the enclosure 102 may involve viewing the light projector 106 and/or enclosure 102 during placement of the light projector 106 in or on the enclosure 102 with one or more cameras, which may be used to identify the location and orientation of the projector fiducial mark(s) 116 relative to the location and orientation of the frame fiducial mark(s) 118. The projector fiducial mark(s) 116 on both sides of the enclosure 102 may be used to balance the frame into a computer aided design (CAD)-nominal position. The projector fiducial mark(s) 116 and the enclosure fiducial mark(s) 118 are each shown in FIG. 2 in the shape of a plus sign. However, other shapes, physical features (e.g., of the light projector 106 and/or of the enclosure 102), reflective surfaces, or other optical identifiers may be used to optically align the light projector 106 relative to the enclosure 102.

Figure 3:
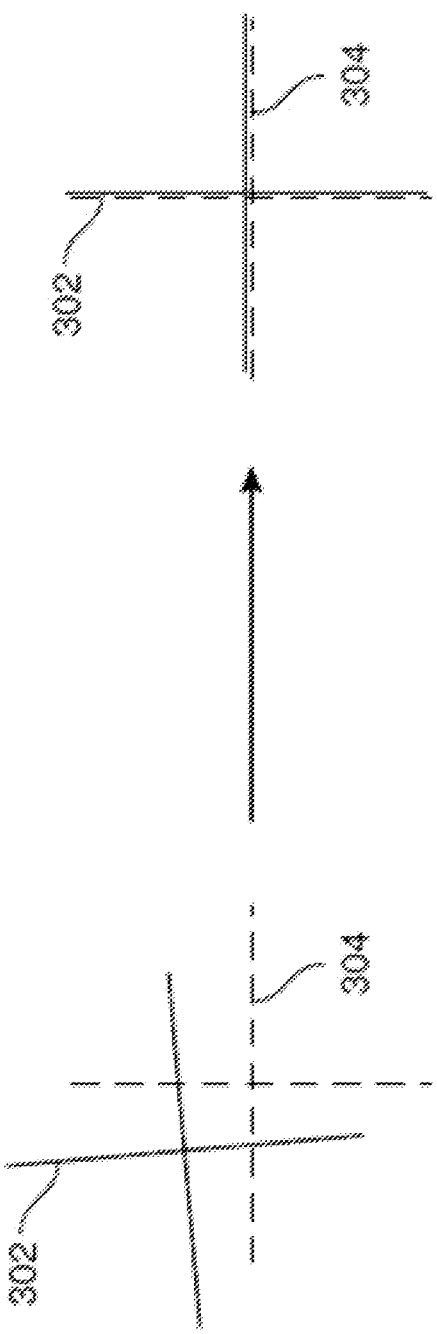
FIG. 3 illustrates optical alignment of a projected pattern as viewed by a camera in accordance with an exemplary embodiment.

FIG. 3 illustrates optical alignment of a projected pattern 302 as viewed by a camera. In some embodiments, the light projector 106 may be aligned relative to the frame 102 using an image projected by the light projector 106. The projected pattern 302 may be a cross or another pattern. The projected pattern 302 may be aligned with a camera target 304. The camera target 304 may be an area identified using computer vision (CV) to identify a center of the projected pattern 302 (e.g., the intersection of two lines if the projected pattern 302 is a cross). The camera may be calibrated to a global-equipment coordinate system such that the mechanical and optical position of the camera target 304 is optimized. The light projector 106 may be physically manipulated to align to the detected center of the projected pattern 302 (e.g., the camera target 304). The projected pattern 302 may be produced by a light projector, such as the light projector 106 described above. One or more cameras may view the projected pattern 302 and compare the location and orientation of the projected pattern 302 to the camera target 304. The light projector and/or a frame to which the light projector is to be mounted may be moved (e.g., laterally shifted, angled, rotated, etc.) to align the projected pattern 302 with the camera target 304 to an acceptable resolve (e.g., within an acceptable tolerance) before the light projector is fixed in position relative to the frame. An acceptable tolerance may be, for example, within 2 arcminutes (arcmin) between the projected pattern 302 and the camera target. Other acceptable tolerances (e.g., 3 arcmin, etc.) between the projected pattern 302 and the camera target may be possible.

Figure 4:
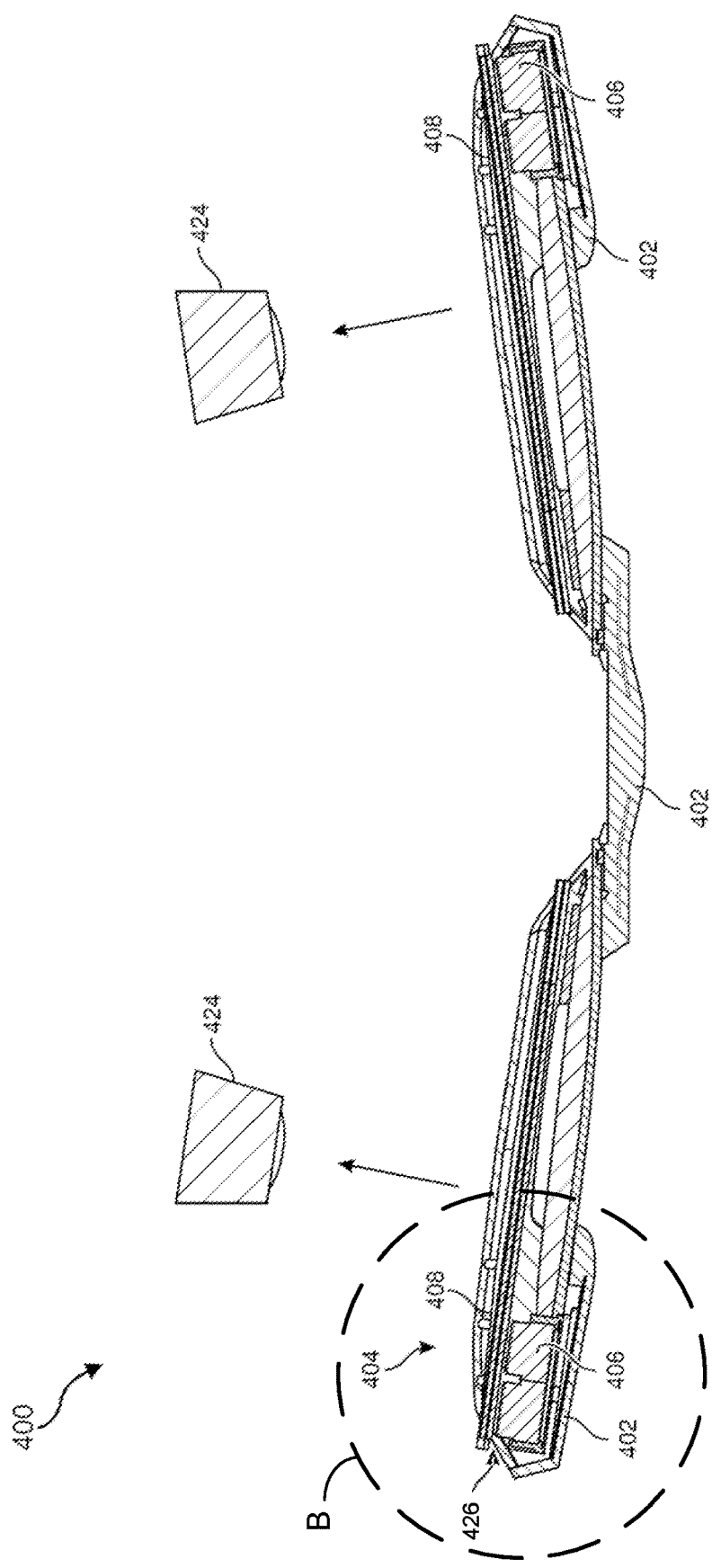
FIG. 4 is a cross-sectional view of a head-mounted display with alignment cameras in accordance with an exemplary embodiment.

FIG. 4 is a cross-sectional view of a head-mounted display 400 with alignment cameras 424. In at least some respects, the head-mounted display 400 may be similar to the head-mounted display 100 described above. For example, the head-mounted display 400 may include a frame 402, and a display assembly 404 including a light projector 406 and a waveguide 408 mounted to the frame 402.

The alignment cameras 424 may be used during assembly of the head-mounted display 400 to optically align the light projector 406 with the frame 402 and/or to optically align the waveguide 408 with the light projector 406. For example, the alignment cameras 424 may be used to detect the location and/or orientation of a fiducial mark (e.g., the projector fiducial marks 116, the frame fiducial marks 118, etc.), a physical component or feature, a reflective material, etc. In additional examples, the alignment cameras 424 may be used to detect a location and/or orientation of a projected pattern (e.g., the projected pattern 302). This detected information may be used to adjust a position and/or orientation of the light projector 406 relative to the frame 402 or of the waveguide 408 relative to the light projector 406 and/or frame 402.

As shown in FIG. 4, a gap 426 may be between the waveguide 408 and the light projector 406. Thus, in some embodiments, the waveguide 408 and the light projector 406 may not be directly coupled to each other. Rather, the light projector 406 and the waveguide 408 may each be separately mounted to the frame 402. This may allow for adjustments in relative position and/or orientation between the light projector 406 and the waveguide 408.

The frame 402 and the light projector 406 may be used substantially aligned. For example, the frame 402 and the light projector 406 may be aligned such that, when viewed by a camera, a projected pattern produced by a light projector 406 and a camera target (e.g., projected pattern 302 and camera target 304 in FIG. 3) are within an acceptable tolerance (e.g., 2 arcmin, 3 arcmin, etc.).

Figure 5:
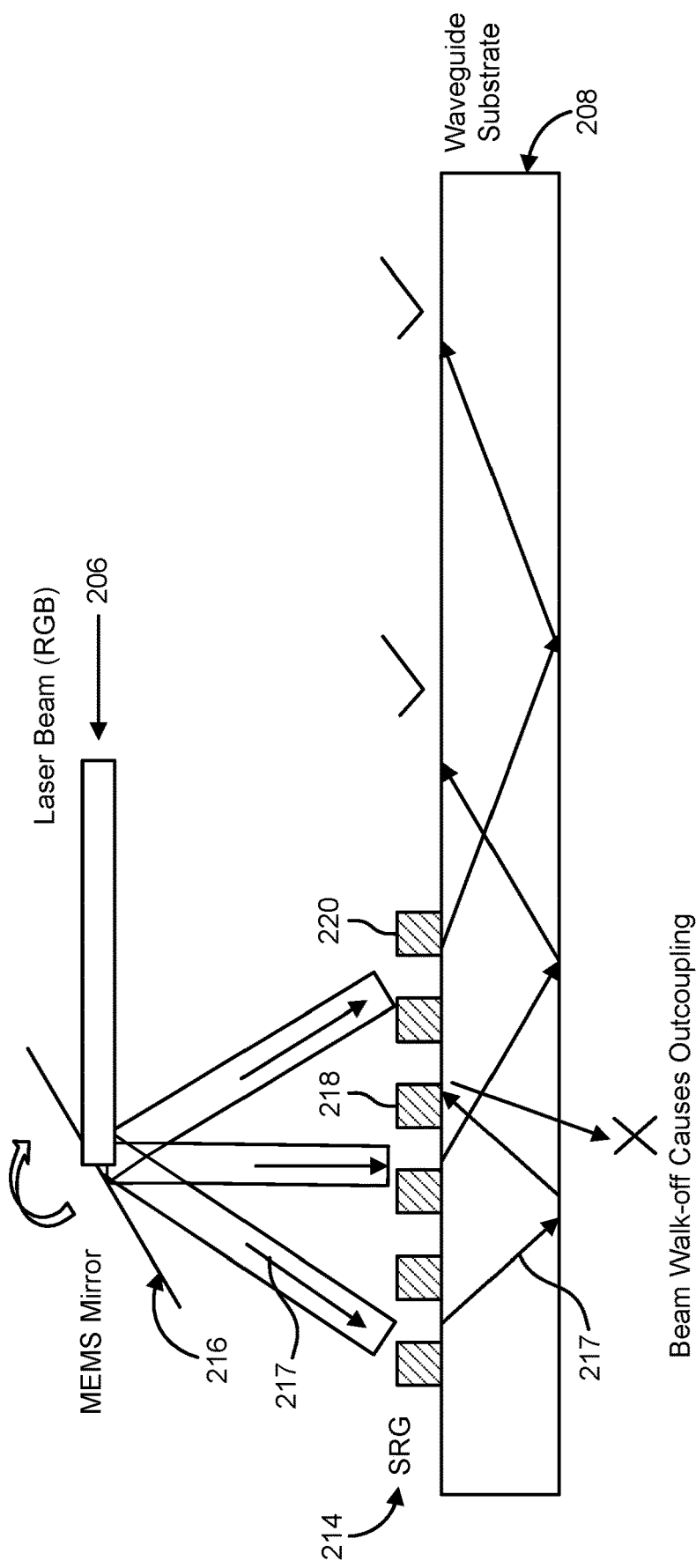
FIG. 5 is a diagram of an example of a light source coupling with a Surface Relief Grating.

Referring now to FIG. 5, a diagram of an example of a two-dimensional (2-D) light source coupling with a surface relief grating is illustrated. In the example of FIG. 5, the 2D scanning light source(s) 206 (e.g., a red-green-blue (RGB) laser beam) may cause a beam walk-off because there may be a gap between a waveguide substrate 208 and a micro-electro-mechanical system (MEMS) mirror 216.

In this regard, the footprint (e.g., a few millimeters (mm)) of a SRG 214 associated with the waveguide substrate 208 may be much larger than the waveguide substrate 208 thickness (e.g., hundreds of micrometers (m)). In the example of FIG. 5, the waveguide substrate 208 thickness may be unable to guarantee that the far-left light ray(s) 217 may view/contact the SRG 214 again after one bounce which may result in beam walk-off (e.g., X in FIG. 5) causing outcoupling of a light ray from the waveguide substrate 208. For example, once the light ray(s) 217 goes through the SRG 214 and the waveguide substrate 208, the light ray(s) 217 may not reflect back and may not be viewed/contacted by any of the gratings (e.g., grating 218, grating 220) associated with the SRG 214. In this regard, light ray(s) 217 may not be coupled and propagated throughout the waveguide substrate 208. As such, in this example, since the light ray(s) 217 may exit the waveguide substrate 208 there may be less light energy propagating through the waveguide substrate 208, which may be undesirable and may result in a lower than desirable contrast ratio.

Exemplary System Operation

Figure 6:
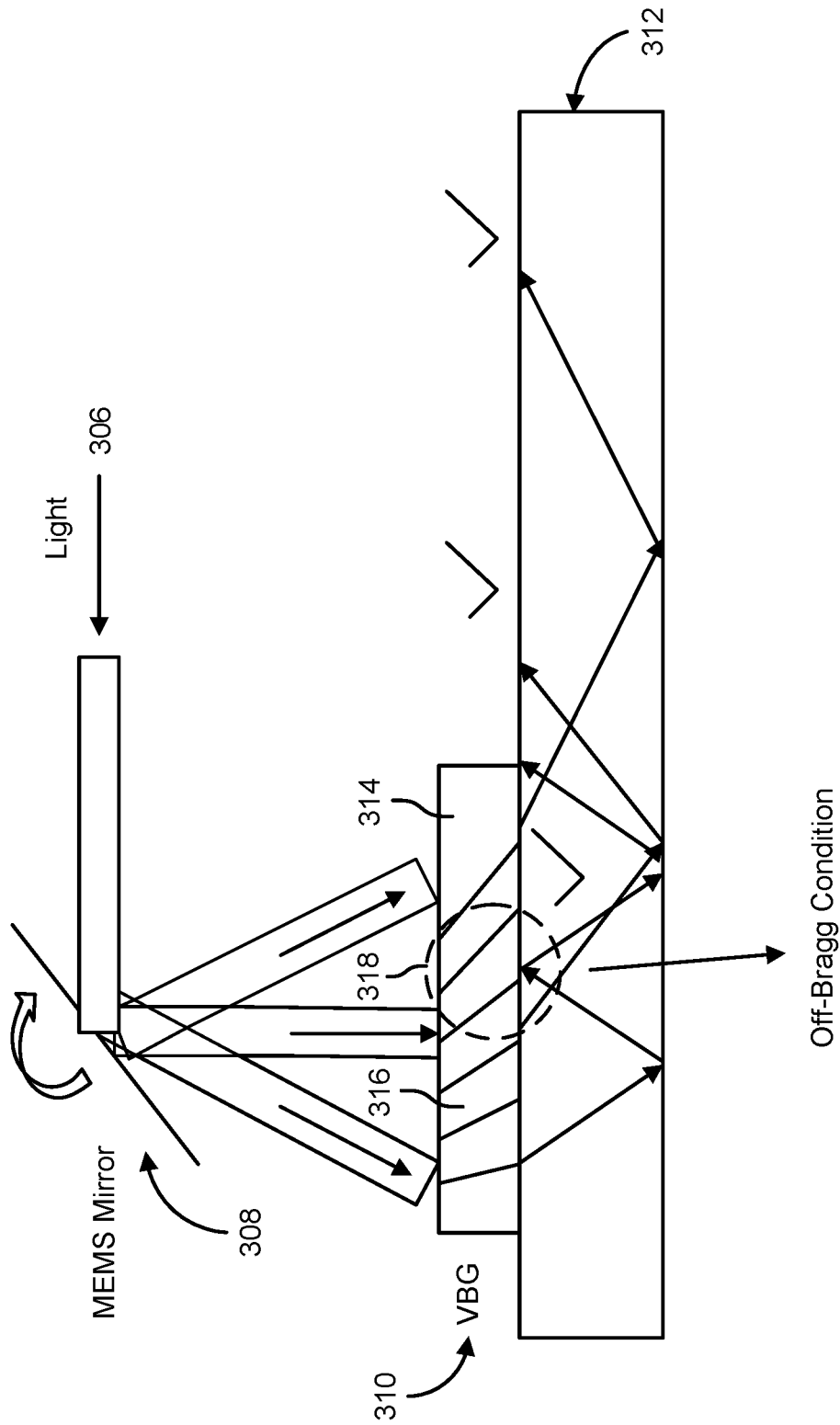
FIG. 6 illustrates an example of a light source coupling with a Volume Bragg Grating in accordance with an exemplary embodiment.

Referring now to FIG. 6, an exemplary embodiment of a light source coupling with a Volume Bragg Grating is illustrated. The light source (e.g., light projector 406) may generate light 306 (e.g., an RGB laser beam). As can be seen in FIG. 6, due to the specific design of the gratings (e.g., grating 314, grating 316) of the VBG 310, of an exemplary embodiment, having spatially uniform surface pitches and spatially varying pitches and slant angles designed, the light 306 projected to the MEMs mirror 308 and to the VBG 310 may not exhibit an off-Bragg condition e.g., no outcoupling of the light in the waveguide 312. In this regard, after one total internal reflection bounce, a slant angle of the VBG 310 may have enough deviation such that a Bragg condition does not occur (e.g., no out-coupling of light from the waveguide 312).

As such, the light 306 entering the waveguide 312 and propagating through the waveguide 312 may not exhibit any energy loss (or may only exhibit negligible energy loss). For example, the rays of light 306 entering through the VBG 310 to the waveguide 312 may not exhibit an off-Bragg condition, as can be seen at the circle 318 of FIG. 6.

Figure 7A:
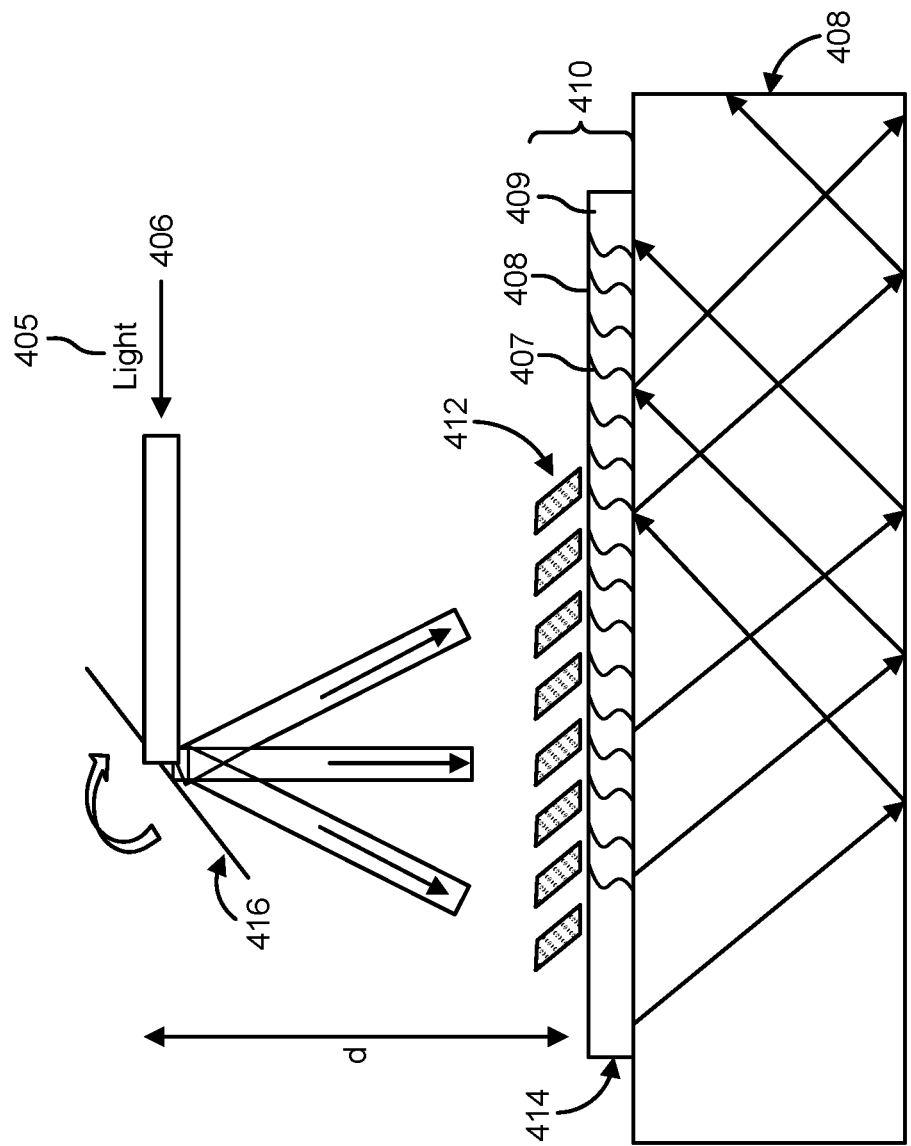
FIG. 7A is a diagram illustrating a device having an exemplary waveguide and light projector of the head-mounted display shown in the dashed circle B of FIG. 4 in accordance with an exemplary embodiment.
Figure 7B:
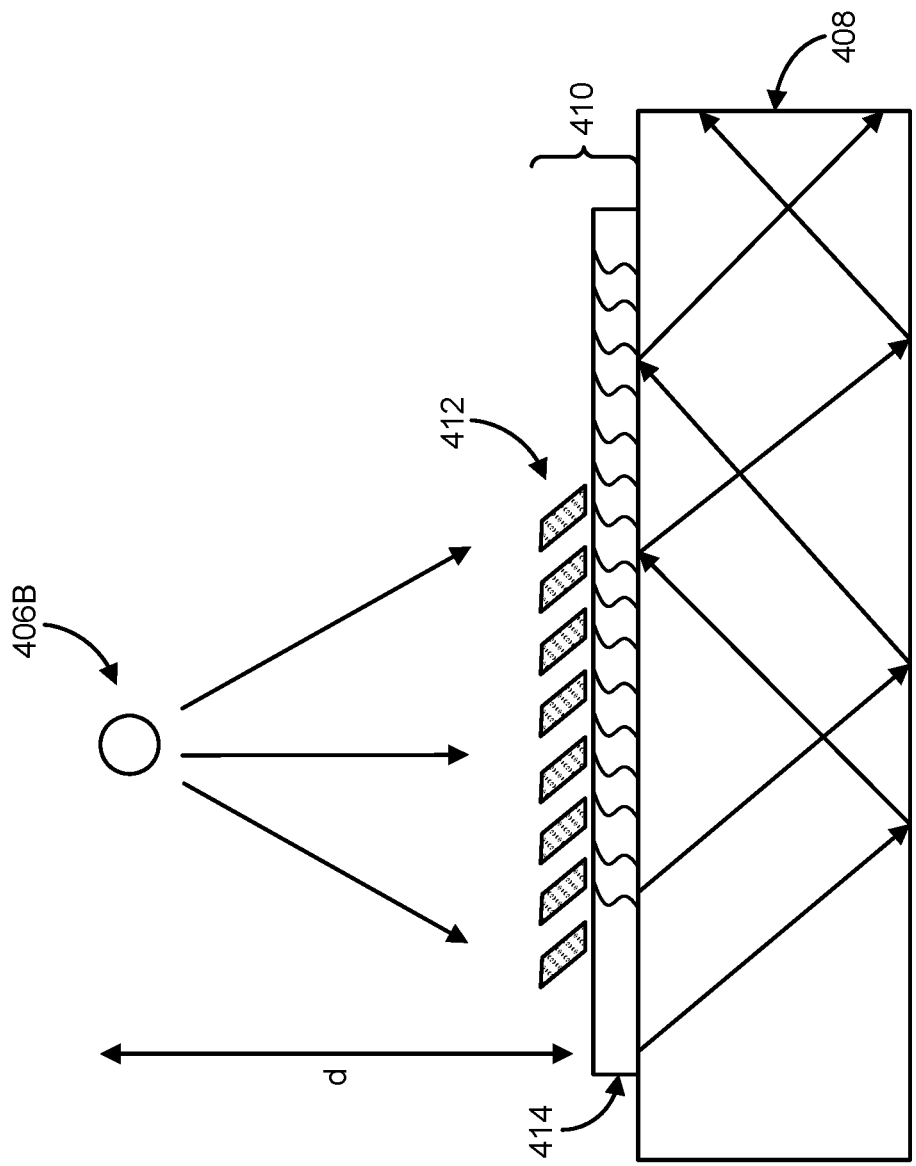
FIG. 7B illustrates an exemplary embodiment of the device of FIG. 7A in which the light projector is a point source in accordance with an exemplary embodiment.

FIG. 7A illustrates a view of the waveguide 408 and a light projector 406 of the head mounted display 400 shown in the dashed circle B of FIG. 4. FIG. 7B illustrates an alternate exemplary embodiment in which light projector 406 is a point source 406B. The input gratings 410 (also referred to herein as input grating assembly 410) are not shown in FIG. 4 to more clearly show overlying features of the head-mounted display 400. In some example embodiments, the display assembly 104 and/or the display assembly 404 may further include a MEMS mirror 416. The MEMS mirror 416 may be configured to direct light 405 from the light projector 406 to input gratings 410. The distance from the MEMS mirror 416 to the VBG 414 may be a distance d as shown in FIG. 7A. Input gratings 410 may be configured to enable light 405 from the light projector 406 to enter into the waveguide 408, to be directed to a portion/area of the waveguide 408 to enable the light to be propagated through the waveguide 408 for presentation to an eye(s) of a user (e.g., a user wearing AR glasses (e.g., an artificial reality system 1100 of FIG. 11)). The light may be propagated through the waveguide 408 for presentation to an eye(s) of the user in an instance in which the light exhibits total internal reflection within the waveguide and is output from an end of the waveguide and directed to an eye(s) of the user. In one example embodiment, for purposes of illustration and not of limitation, the light propagated through the waveguide 408 may be utilized to direct images from the light projector 406 to a user's eye. Input grating assembly 410 may be further comprised of a SRG 412 and the VBG 414.

Light 405 reflected from the MEMS mirror 416 may be reflected into SRG 412, which may diffract the light into VBG 414. The VBG 414 may further diffract the light from SRG 412 to enter into the waveguide 408, to be propagated through the waveguide 408 for presentation to a user's eye. The configuration of input grating assembly 410 may cause in-coupling (e.g., total internal reflection) of the rays of light 405 within the waveguide 408.

The grating pitch within VBG 414 may be configured to have spatially varying grating structures to reject light that has already been reflected from the opposite end or front of the waveguide 408. The VBG 414 may have a grating pitch (Λ) that may be determined by a controller (e.g., controller 1104 of FIG. 11) implementing/executing a Bragg Condition equation $\lambda=2\Lambda \cos(\theta-\alpha)$, where $\theta$ is the angle of the incidence (e.g., light diffracted into a VBG), a is the grating slant angle, and $\lambda$ is the wavelength of light. After one total internal reflection of a ray(s) of the light 405 entering the SRG 412, the VBG 414, and the waveguide 408, a VBG grating pitch of the VBG 414 may have enough deviation among the gratings (e.g., grating 407, grating 408, grating 409) such that a Bragg condition is not exhibited (e.g., a Bragg condition is not met). In an instance in which there is no Bragg Condition (e.g., an off-Bragg condition) is met, there may be no beam walk-off or out-coupling of the rays of light (e.g., light 405) propagating in the waveguide 408. When there is an off-Bragg condition, the light may not exhibit a beam walk-off and may not cause outcoupling of light out of the waveguide 408.

Spatially varying grating structures (e.g., grating 407, grating 408, grating 409) may allow certain light beams to enter the VBG 414 after diffraction by SRG 412. The VBG 414 may have spatially varying parameters (such as, for example, period, slant angle, etc.), and in an instance in which the propagated light beam(s) interacts with the VBG 414 again, the light beam(s) may no longer fall in (e.g., be within) the sensitive response range of the VBG 414. In an exemplary embodiment, the light beam(s) may be guided within the waveguide and may be extracted in front of the eyes of a user, in an instance in which the user may have some distance from an in-coupling location of the waveguide. The VBG 414 may be fabricated with any suitable photopolymer (e.g., polycarbonate, etc.) such that when light illuminates the photopolymer, the photopolymer may become sensitive which may result in the refractive index of the photopolymer changing with respect to light level. For example, in an instance in which light is stronger, the refractive change may be larger. On the other hand, for example, in an instance in which light is weaker, the refractive index change may be weaker. An example of strong light may be light having light intensity greater than 100 megawatt (mW)/cm^2, and an example of weak light may be light having light intensity less than 1 mW/cm^2.

As described above, FIG. 7B illustrates an alternate exemplary embodiment in which light projector 406 may be a point source 406B. The distance from the point source 406B to the VBG 414 may be a distance d as shown in FIG. 7B.

Figure 8:
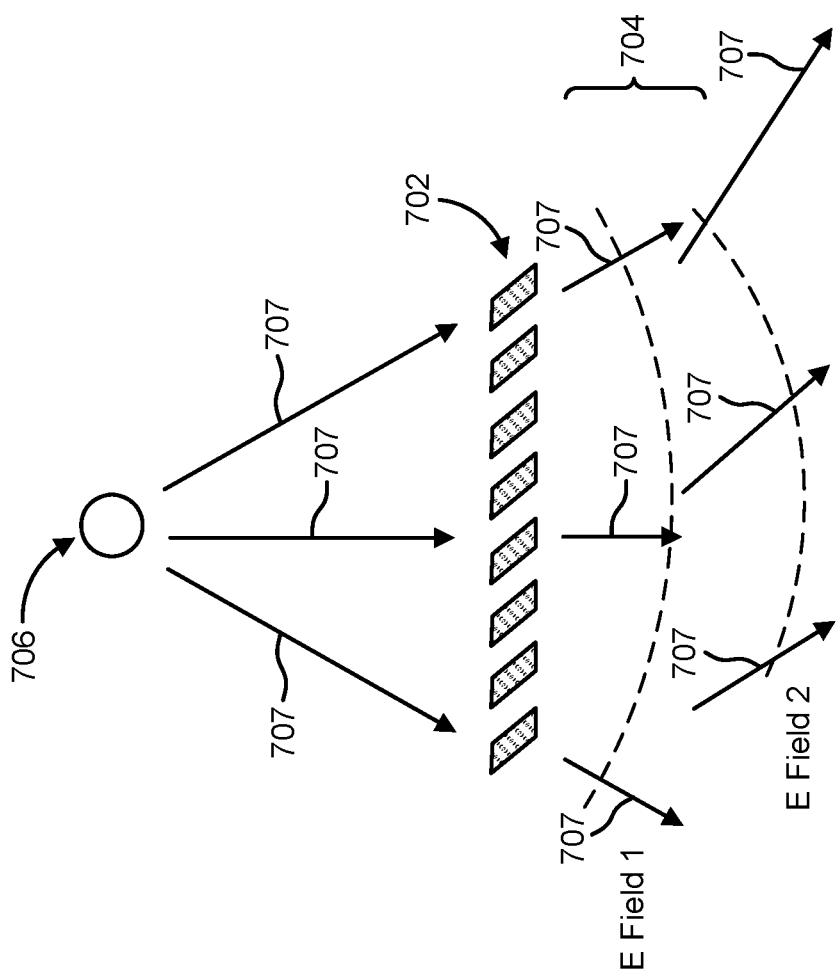
FIG. 8 illustrates exemplary electric fields created by light passing through a VBG and an SRG.

FIG. 8 illustrates exemplary electric fields that may be generated by light passing through VBG 704 and SRG 702. In the example of FIG. 8, the light projector 106 or the light projector 406 from FIG. 1 and FIG. 4 respectively may be the point source 706. In an instance in which light beams 707 are projected from point source 706 to SRG 702, at least one of the light beams 707 may generate an electric (E) field 1. When this light beam(s) is diffracted in VBG 704, an E field 2 may be generated based on this diffracted light beam(s). The VBG 704 may reflect the diffracted light beam(s) to the waveguide. In this manner, for purposes of illustration and not of limitation, the SRG 702 may be designed to have, for example, a 50% diffraction efficiency. Half of the light beams 707 may keep the original propagation and half of the light may be diffracted.

The electric fields (e.g., E field 1 and E field 2) generated based on the light beam(s) interacting with grating SRG 702 and VBG 704 may cause an interference pattern which may generate an interference hologram. The interference hologram may be recorded by the photopolymer associated with the VBG 704. The interference hologram denotes the light beam(s) reflected in the waveguide that avoids a beam walk-off scenario and is not outcoupled from the waveguide. The interference hologram may be generated by two beam interference, and the two beams may be specifically designed, including incident angle, wavefront shape, etc.

Figure 9:
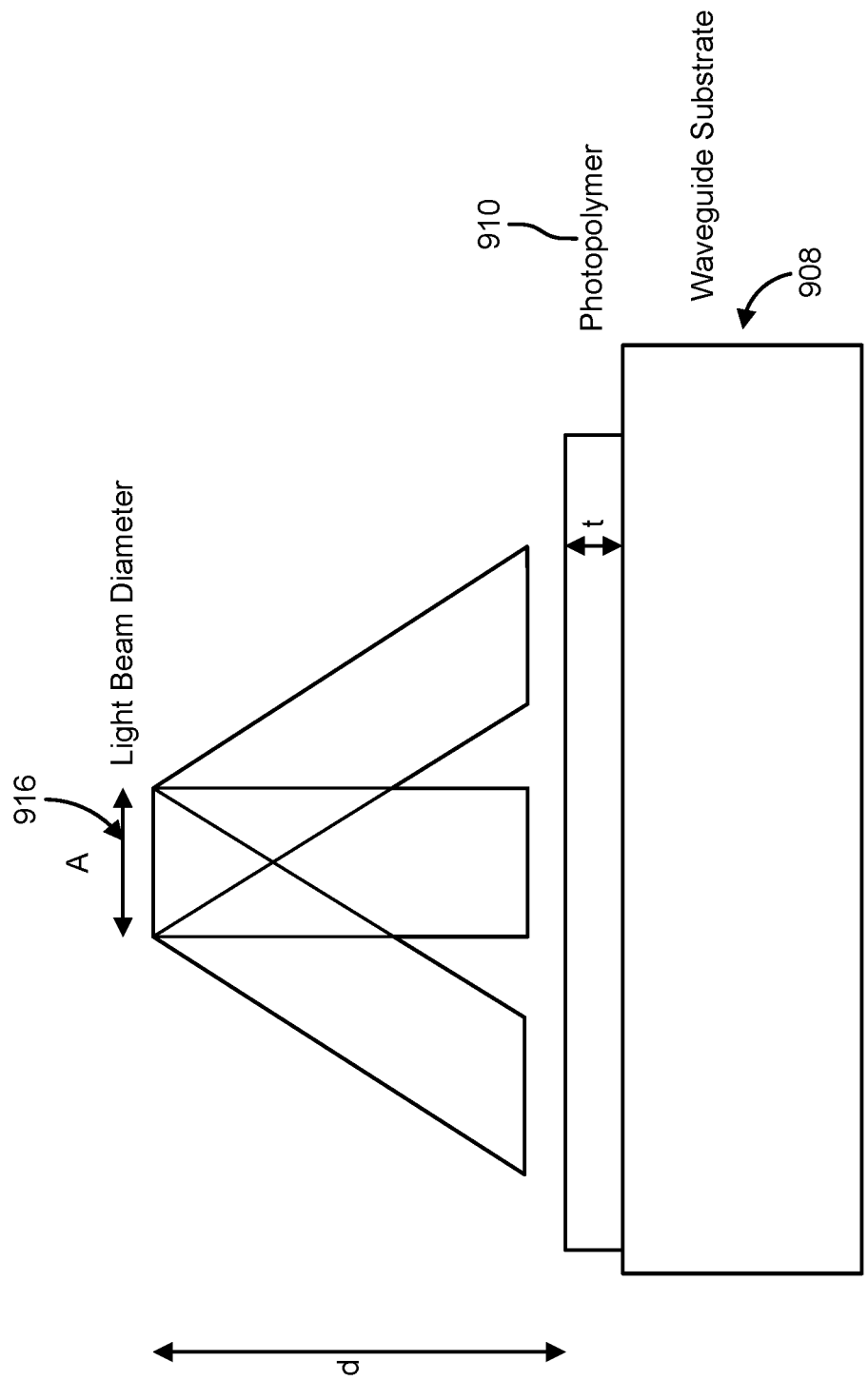
FIG. 9 illustrates a photopolymer thickness determination in accordance with an exemplary embodiment.

Referring to FIG. 9, a diagram illustrating a photopolymer thickness estimation according to an exemplary embodiment is provided. The thickness t of the photopolymer substrate may be determined as follows $t \sim d/A * \lambda$, where d is the distance between a MEMS mirror 916 to the photopolymer 910. The photopolymer 910 may be on a waveguide substrate 908. Suppose, for purposes of illustration and not of limitation, that A is 2 millimeters, d is 2 centimeters and $\lambda$ is 0.5 micrometers. In this regard, the photopolymer thickness t may be determined according to the following: 2 centimeters/2 millimeters×0.5 micrometers which is 20 micrometers. In other examples, the photopolymer thickness t may be any other suitable values (e.g., 10 micrometers, 30 micrometers, 40 micrometers, etc.). In some exemplary embodiments, a controller (e.g., controller 1104 of FIG. 11) may determine the photopolymer thickness t.

An importance of the thickness of the photopolymer is that if the thickness is too thin, the VGB (e.g., VBG 414) may have an undesirable grating effect. Additionally, the photopolymer thickness t may affect the interference hologram response range, such as spectral and angular response range. In some example embodiments, a controller (e.g., controller 1104 of FIG. 11) may determine whether the photopolymer thickness t is above a predetermined threshold. In some example embodiments, the controller may determine whether the photopolymer thickness t is above a predetermined threshold such as, for example, greater than 10 µm. In some other alternative example embodiments, the controller may determine whether the photopolymer thickness t is above any other suitable predetermined threshold (e.g., greater than 20 µm, etc.) The photopolymer thickness t being above the predetermined threshold may denote a sufficient photopolymer thickness t.

Figure 10:
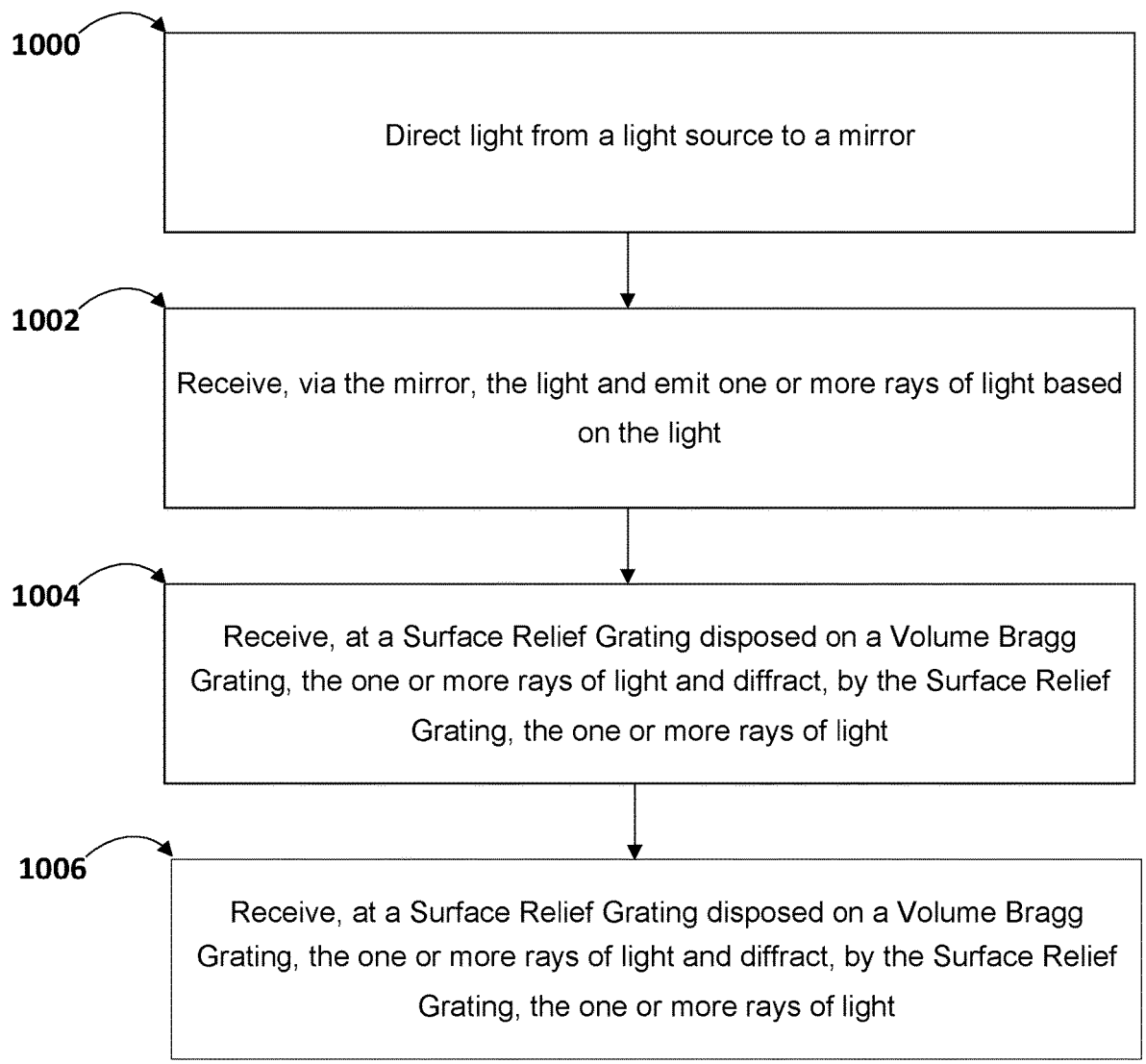
FIG. 10 is a diagram of an exemplary process for reflecting rays of light via a waveguide in accordance with an exemplary embodiment.

FIG. 10 illustrates an example flowchart illustrating operations for reflecting rays of light via a waveguide according to an exemplary embodiment. At operation 1000, a device (e.g., artificial reality system 1100 of FIG. 11) may direct light from a light source (e.g., light projector 406) to at least one mirror (e.g., MEMS mirror 416). At operation 1002, a device (e.g., artificial reality system 1100) may receive, via the mirror, the light and may emit one or more rays of light based on the light from the light source.

At operation 1004, a device (e.g., artificial reality system 1100) may receive, at a Surface Relief Grating (e.g., SRG 412) disposed on a Volume Bragg Grating (e.g., VBG 414), the rays of light and may diffract, by the Surface Relief Grating, the rays of light. At operation 1006, a device (e.g., artificial reality system 1100) may reflect, by the Volume Bragg Grating, the rays of light causing the rays of light to propagate throughout a waveguide (e.g., waveguide 408) such that an off-Bragg condition may be exhibited by the rays of light propagating throughout the waveguide. The off-Bragg condition may not exhibit beam walk-off or outcoupling of the rays of light propagating within the waveguide. The off-Bragg condition may result in total internal reflection of the rays of light that propagate throughout the waveguide.

Exemplary Artificial Reality Device

Figure 11:
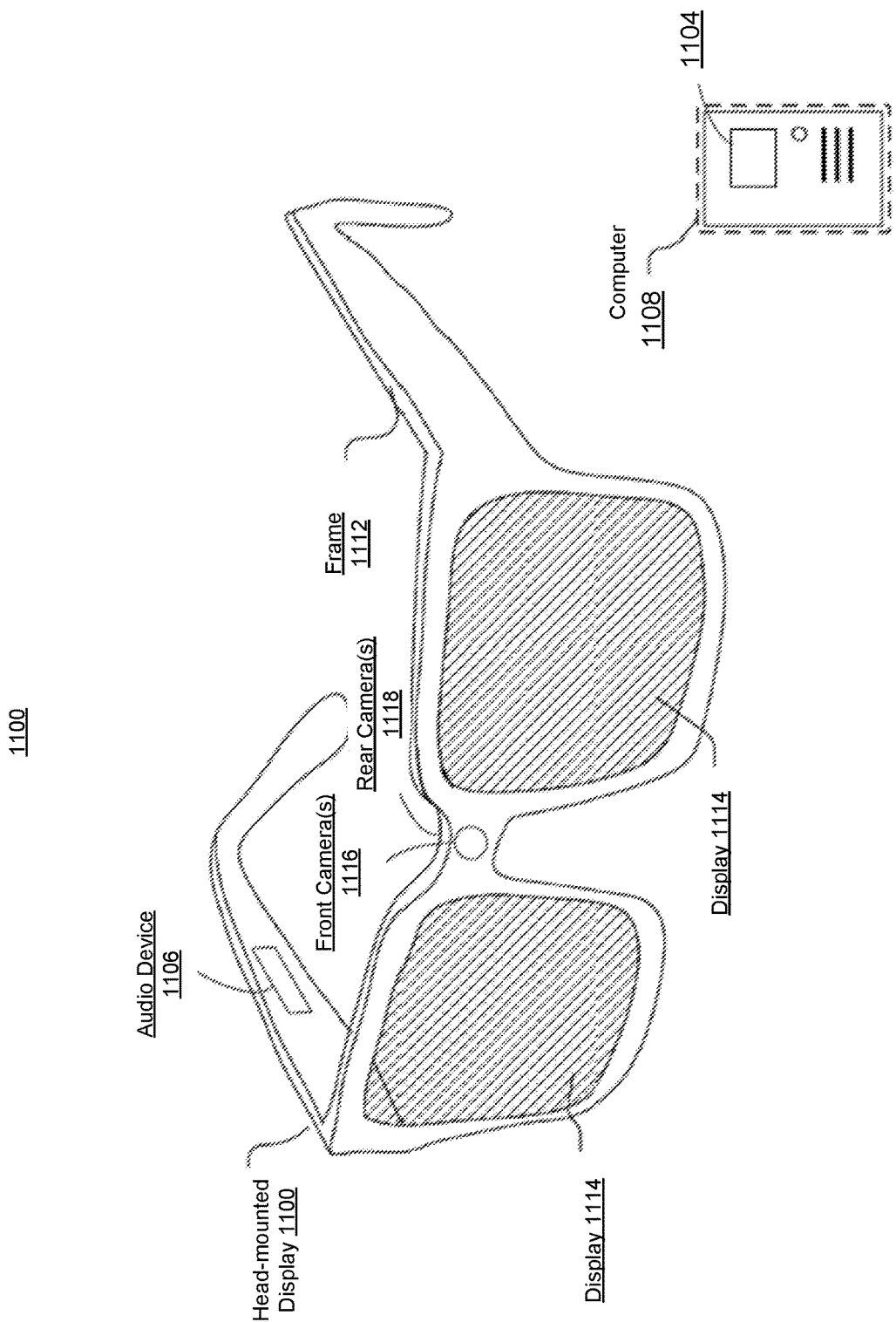
FIG. 11 illustrates an artificial reality system comprising a headset in accordance with an exemplary embodiment.

FIG. 11 illustrates an example artificial reality system 1100. The artificial reality system 1100 may include a head-mounted display (HMD) 1110 (e.g., smart glasses) comprising a frame 1112, one or more displays 1114, and a computing device 1108 (also referred to herein as computer 1108). The displays 1114 may be transparent or translucent allowing a user wearing the HMD 1110 to look through the displays 1114 to see the real world (e.g., real world environment) and displaying visual artificial reality content to the user at the same time. The HMD 1110 may include an audio device 1106 (e.g., speakers/microphones) that may provide audio artificial reality content to users. The HMD 1110 may include one or more cameras 1116, 1118 which may capture images and/or videos of environments. In one exemplary embodiment, the HMD 1110 may include a camera(s) 1118 which may be a rear-facing camera tracking movement and/or gaze of a user's eyes.

One of the cameras 1116 may be a forward-facing camera capturing images and/or videos of the environment that a user wearing the HMD 1110 may view. The HMD 1110 may include an eye tracking system to track the vergence movement of the user wearing the HMD 1110. In one exemplary embodiment, the camera(s) 1118 may be the eye tracking system. In some exemplary embodiments, the camera(s) 1118 may be one camera configured to view at least one eye of a user. In some other exemplary embodiments, the camera(s) 618 may include multiple cameras viewing each of the eyes of a user to enhance the capture of an image(s). The HMD 1110 may include a microphone of the audio device 1106 to capture voice input from the user. The augmented reality system 1100 may further include a controller 1104 comprising a trackpad and one or more buttons. The controller 1104 may receive inputs from users and relay the inputs to the computing device 1108. The controller may also provide haptic feedback to one or more users. The computing device 1108 may be connected to the HMD 1110 and the controller through cables or wireless connections. The computing device 1108 may control the HMD 1110 and the controller to provide the augmented reality content to and receive inputs from one or more users. In some example embodiments, the controller 1104 may be a standalone controller or integrated within the HMD 1110. The computing device 1108 may be a standalone host computer device, an on-board computer device integrated with the HMD 1110, a mobile device, or any other hardware platform capable of providing artificial reality content to and receiving inputs from users. In some exemplary embodiments, HMD 1110 may include an artificial reality system/virtual reality system.

Alternative Embodiments

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. A device comprising:
   at least one light source configured to generate light;
   at least one mirror configured to direct the light into one or more rays of light;
   a Surface Relief Grating disposed on a Volume Bragg Grating, the Surface Relief Grating configured to receive the one or more rays of light and diffract the one or more rays of light onto one or more gratings of the Volume Bragg Grating; and
   at least one waveguide disposed beneath the Volume Bragg Grating, wherein the at least one waveguide is configured to receive the one or more rays of light from the Volume Bragg Grating and propagate the one or more rays of light throughout the at least one waveguide such that an off-Bragg condition is exhibited by the one or more rays of light propagating through the at least one waveguide.

2. The device of claim 1, wherein the off-Bragg condition does not exhibit beam walk-off or out-coupling of the one or more rays of light propagating within the at least one waveguide.

3. The device of claim 1, wherein the off-Bragg condition results in total internal reflection of the one or more rays of light that propagate throughout the at least one waveguide.

4. The device of claim 1, wherein the device comprises a head-mounted display device and wherein the Volume Bragg Grating comprises a photopolymer.

5. The device of claim 4, wherein the photopolymer is configured to record at least one interference hologram generated based in part on an electric field generated based on the one or more rays of light being diffracted, to obtain one or more diffracted light rays, by the Surface Relief Grating and a second electric field generated based on the one or more diffracted light rays being received by the Volume Bragg Grating and reflected by the Volume Bragg Grating into the at least one waveguide.

6. The device of claim 4, further comprising:
   one or more processors; and
   at least one memory storing instructions, that when executed by the one or more processors, cause the device to:
      determine a thickness of the photopolymer based in part on a wavelength of the light, a distance between the at least one mirror and the photopolymer, and a diameter of the light.

7. The device of claim 1, wherein the one or more gratings of the Volume Bragg Grating are configured to receive the diffracted one or more rays of light.

8. The device of claim 1, wherein the one or more gratings comprise a slant angle configured to receive the diffracted one or more rays of light and reflect the one or more diffracted light rays based on the slant angle.

9. A method comprising:
   directing light from a light source to at least one mirror;
   receiving, via the at least one mirror, the light and emitting one or more rays of light based on the light;
   receiving, at a Surface Relief Grating disposed on a Volume Bragg Grating, the one or more rays of light and diffracting, by the Surface Relief Grating, the one or more rays of light onto one or more gratings of the Volume Bragg Grating; and
   reflecting, by the Volume Bragg Grating, the one or more rays of light causing the one or more rays of light to propagate throughout at least one waveguide of a device such that an off-Bragg condition is exhibited by the one or more rays of light propagating through the at least one waveguide.

10. The method of claim 9, wherein the Volume Bragg Grating is disposed on the at least one waveguide.

11. The method of claim 9, wherein the device comprises a head-mounted display device.

12. The method of claim 9, wherein the off-Bragg condition does not exhibit beam walk-off or out-coupling of the one or more rays of light that propagate within the at least one waveguide.

13. The method of claim 9, wherein the off-Bragg condition results in total internal reflection of the one or more rays of light that propagate throughout the at least one waveguide.

14. The method of claim 9, wherein the Volume Bragg Grating comprises a photopolymer.

15. The method of claim 14, further comprising:
   recording, by the photopolymer, at least one interference hologram generated based in part on an electric field generated based on the one or more rays of light being diffracted, to obtain one or more diffracted light rays, by the Surface Relief Grating and a second electric field generated based on the one or more diffracted light rays being received by the Volume Bragg Grating and reflected by the Volume Bragg Grating into the at least one waveguide.

16. The method of claim 14, further comprising:

determining a thickness of the photopolymer based in part on a wavelength of the light, a distance between the at least one mirror and the photopolymer, and a diameter of the light.

17. The method of claim 9, wherein the one or more gratings of the Volume Bragg Grating are configured to receive the diffracted one or more rays of light.

18. The method of claim 9, wherein the one or more gratings comprise a slant angle configured to receive the diffracted one or more rays of light and reflect the diffracted one or more rays of light based on the slant angle.

19. A non-transitory computer-readable medium storing instructions that, when executed, cause:

directing light from a light source to at least one mirror;

facilitating receipt, via the at least one mirror, of the light and emitting one or more rays of light based on the light;

facilitating receipt, at a Surface Relief Grating disposed on a Volume Bragg Grating, of the one or more rays of light and diffracting, by the Surface Relief Grating, the one or more rays of light onto one or more gratings of the Volume Bragg Grating; and facilitating reflection, by the Volume Bragg Grating, of the one or more rays of light causing the one or more rays of light to propagate throughout at least one waveguide of a device such that an off-Bragg condition is exhibited by the one or more rays of light propagating through the at least one waveguide.

20. The computer-readable medium of claim 19, wherein the Volume Bragg Grating is disposed on the at least one waveguide.

* * * * *